Jan. 30, 1951     G. MEIER     2,539,456

PILING

Filed Sept. 11, 1946     5 Sheets—Sheet 1

INVENTOR.
GEORGE MEIER
BY
Oberlin + Limbach
ATTORNEYS.

Jan. 30, 1951     G. MEIER     2,539,456
PILING
Filed Sept. 11, 1946     5 Sheets-Sheet 2

INVENTOR.
GEORGE MEIER
BY
Oberlin & Limbach
ATTORNEYS.

Jan. 30, 1951  G. MEIER  2,539,456
PILING
Filed Sept. 11, 1946  5 Sheets-Sheet 3

INVENTOR.
GEORGE MEIER
BY
Oberlin & Limbach
ATTORNEYS

Jan. 30, 1951  G. MEIER  2,539,456

PILING

Filed Sept. 11, 1946  5 Sheets-Sheet 4

INVENTOR.
GEORGE MEIER
BY
Oberlin & Limbach
ATTORNEYS

Jan. 30, 1951 G. MEIER 2,539,456
PILING
Filed Sept. 11, 1946 5 Sheets-Sheet 5

INVENTOR.
GEORGE MEIER
BY
Oberlin + Limbach
ATTORNEYS.

Patented Jan. 30, 1951

2,539,456

UNITED STATES PATENT OFFICE 2,539,456

PILING

George Meier, Houston, Tex., assignor of one-third to Howard Keck, Houston, Tex., and one-third to Continental Oil Company, Ponca City, Okla., a corporation of Delaware Application September 11, 1946, Serial No. 696,202

10 Claims. (Cl. 61—53)

In any construction operation such as in the case of the erection of structures or the drilling of wells and the like, it is frequently necessary to erect piling which is driven into the ground and on which a structure or apparatus is supported. When the operation requiring the piling supporting structure is concluded, as for example when a drilled well is either discontinued or abandoned, it is desirable and many times necessary to remove the piling. This is desirable in many instances in order to salvage the piling for reuse and, in many instances, it is necessary because the piling, if permitted to remain, would constitute an undesirable obstruction.

When drilling oil wells in off-shore areas, the piling must be erected to support the drilling rig and other well appurtenances above the level of the water. When the well is discontinued, the piling should be removed. Otherwise, it serves as a hazard to navigation.

It is a principal object of my invention to provide a piling structure characterized in that a plurality of piling units may be assembled into a rigid column and then readily disassembled not only for the purpose of salvaging the same but for the purpose of clearing the space for the reasons previously enumerated.

It is a further object of this invention to provide a piling structure in which the connections between the several piling units are such that assembly and disassembly may be accomplished readily even though the piling has been submerged or otherwise exposed to the elements for a considerable period of time.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
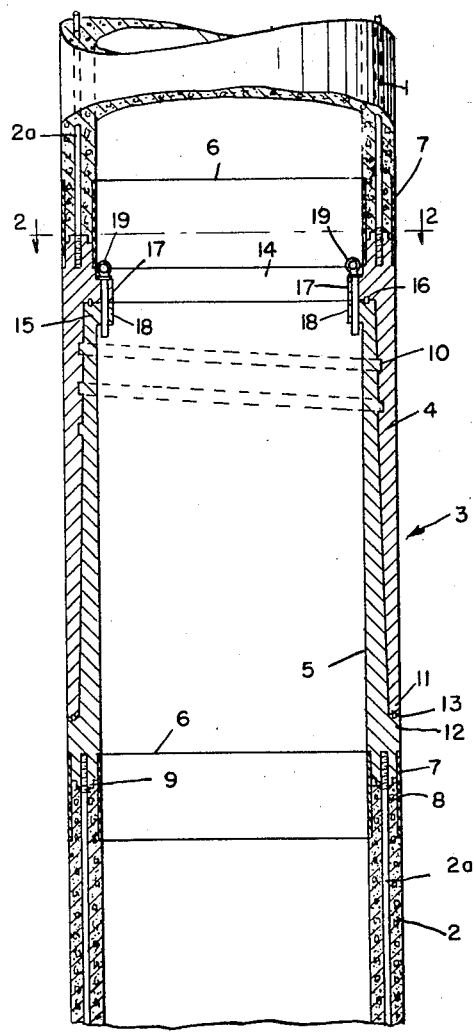
Fig. 1 is a vertical section through a piling connection illustrating one embodiment of my invention.
Figure 5:
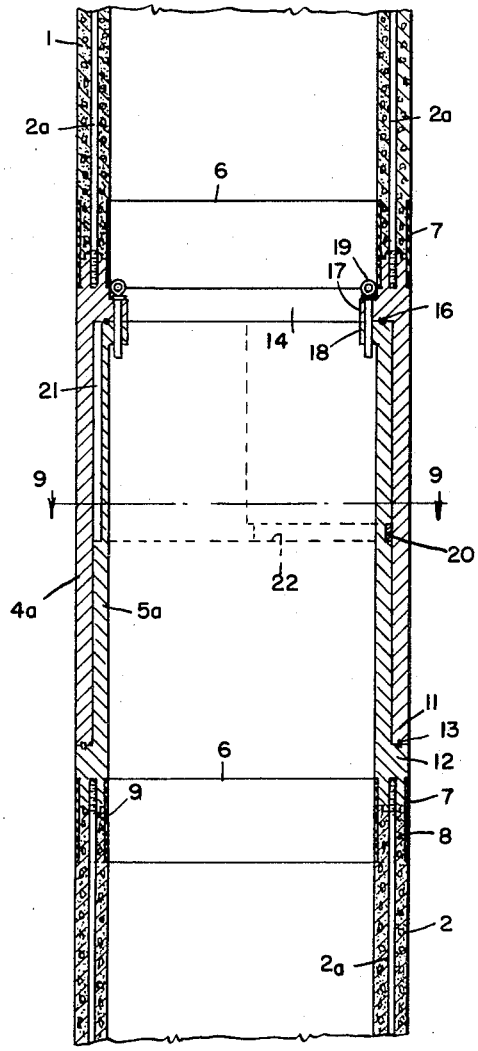
Figure 9:
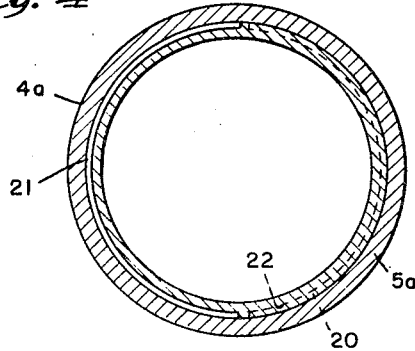
Figure 12:
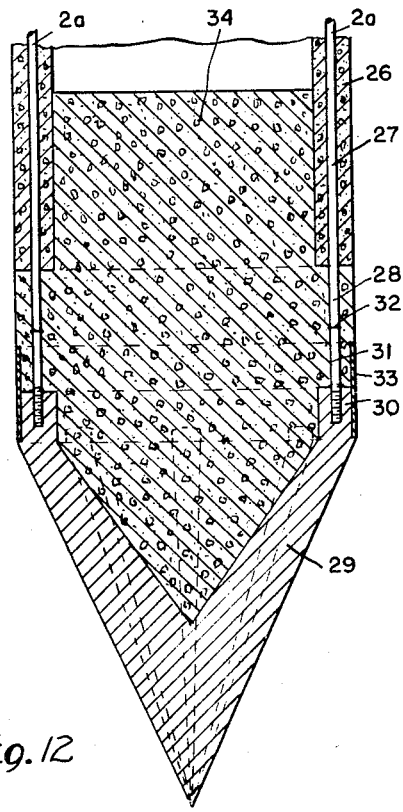
Figure 11:
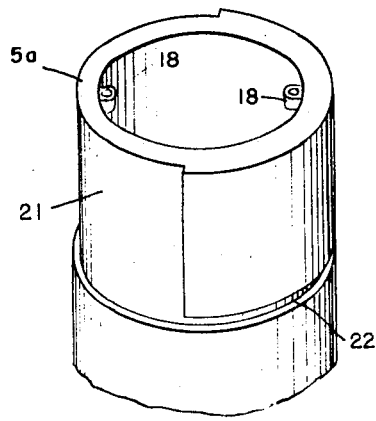
Figure 7:
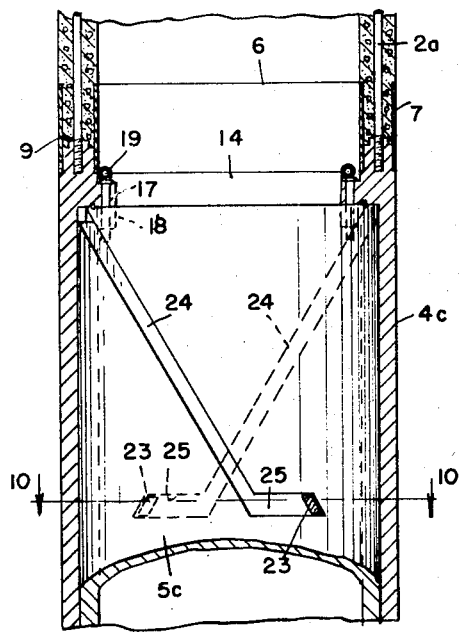
Figure 13:
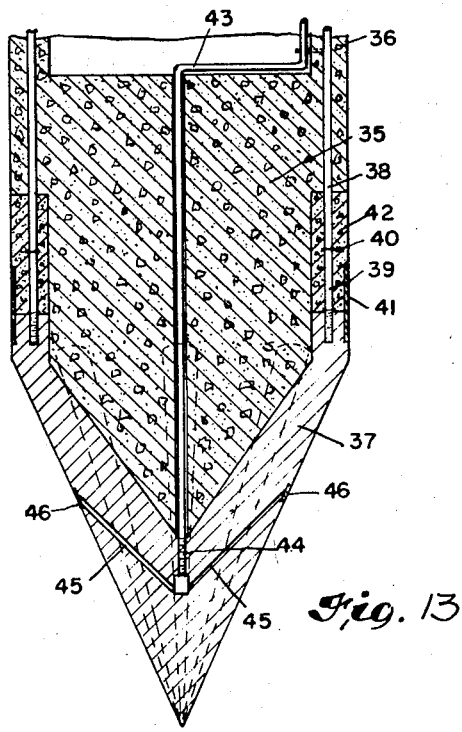
Figure 10:
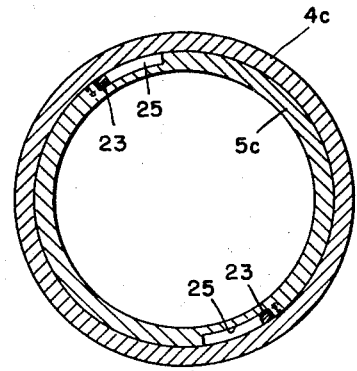
Figure 14:
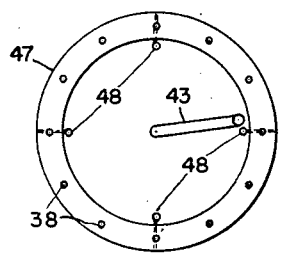
Figure 16:
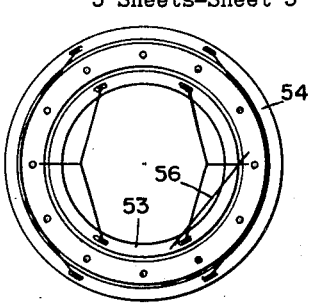
Figure 15:
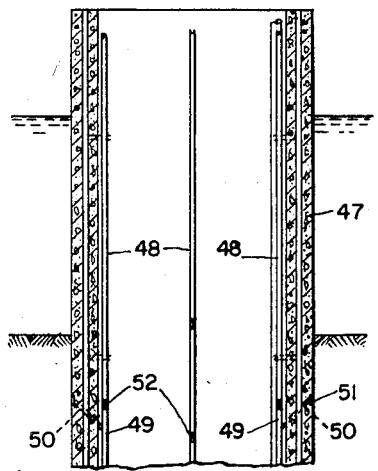
Figure 15:
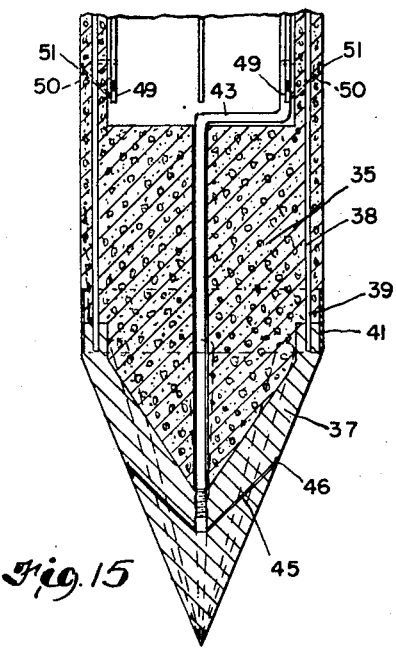

Figs. 3, 4, 5, 6, 7, and 8 are sectional views similar to Fig. 1 but showing modified forms of construction of the connection;

Fig. 9 is a transverse sectional view of the modification illustrated in Fig. 5 taken on a plane indicated by the line 9—9;

Fig. 10 is a transverse sectional view of the modification illustrated in Fig. 7 taken on a plane indicated by the line 10—10;

Fig. 11 is a perspective view of one of the elements of the modification illustrated in Fig. 5;

Fig. 12 is a vertical section of one form of connection showing the manner in which my invention may be adapted to the securing of the piercing point to the lowermost section in the piling column;

Fig. 13 is a vertical section similar to Fig. 12 but showing a modified form of such connection;

Fig. 14 is a plan view of still a further modified form of construction of my invention;

Fig. 15 is a vertical section view of the structure illustrated in Fig. 14;

Fig. 16 is a plan view of another modified form of construction; and

Figure 17:
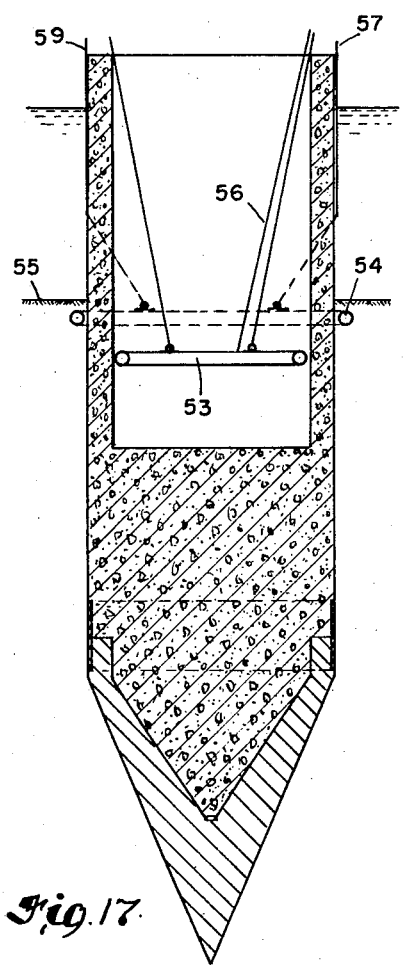

Fig. 17 is a vertical section view of the construction of Fig. 16.

Referring now more specifically to the drawings and more especially to Fig. 1, the structure here illustrated comprises an upper piling element 1 and a lower piling element 2, such elements being secured in axial alignment and against relative radial and axial displacement by means of the connection generally indicated at 3.

The connection 3 comprises a female member 4 and a male member 5, such members being respectively connected to the piling elements 1 and 2 by each such member having a plurality of circumferentially spaced axially extending threaded openings in their outer ends into which are threaded the ends of the steel reinforcing bars 2a of the piling units 1 and 2.

At this point it should be noted that in the embodiment of the invention illustrated in the drawings, the piling units have been shown as of the reinforced concrete type, these usually comprising a cylindrical shell of concrete reinforced by a lattice-work of steel reinforcing bars extending longitudinally thereof.

In the construction of piling units in accordance with my invention, the reinforcing bars 2a are first threaded into the members 4 or 5, after which a steel band 6 is placed about the inside of the end of the member 4 or 5 and another steel band 7 is placed about the outer periphery of such end. After the metallic parts have been thus assembled, the piling unit such as 1 or 2 is cast in a conventional manner with the concrete in the area, generally indicated at 8, forced into the space between the bands 6 and 7 and against the end of the unit 4 or 5, whichever the case may be. In this connection it should be noted that it is sometimes desirable to provide the face of the members 4 and 5 against which the concrete is forced with an upstanding ridge as at 9 to provide a greater area of contact and better bond between the concrete portion of the pile and the connection member. The ridge 9 may be either continuous or interrupted as desired. If interrupted, then the interruption should preferably occur in the spaces between the areas where there are provided the threaded openings for the reception of the reinforcing bars 2a.

Each piling unit such as 1 and 2 will have its opposite ends provided with male and female members such as 4 and 5 respectively. The male member comprises a cylindrical body generally indicated at 1 which, in the modification illustrated in Fig. 1, is axially tapered to a slight extent and on its periphery provided with helically extending flanges 10 on the order of screw threads. The female members 4 are, on their outer surface, substantially cylindrical and, on their inner surface, slightly tapered axially so as to snugly engage in telescopic fashion the outer periphery of the member 5. In this connection it will be noted that when the member 5 is provided with threads such as 10, then the inner periphery of the member 4 will be provided with complementary thread grooves, only two of which are shown in Fig. 1, although more would be provided in actual construction.

The outer end 11 of the female member 4 is adapted to abut against a peripheral shoulder 12 on the male member 5, and, in the space between the two members where they engage on such shoulder, there is provided a seal 13 in the form of an annular ring seating in an annular recess formed in either or both of the members 4 and 5.

The member 4 is provided with an inwardly extending flange 14 adjacent the end 15 of the male member 5 and in that area of contact between the two members there is also provided a sealing ring 16 similar to the sealing ring 13 previously described. The two sealing rings 13 and 16 seal the space between the members 4 and 5 where they are in overlying telescopic engagement, and, when the parts are assembled, such space will be packed with a suitable corrosion-resistant material, and for this purpose a heavy grease is particularly desirable for use because it possesses the additional property of being a lubricant and in this fashion will facilitate assembly and disassembly of the parts.

At substantially diametrically spaced points, the inwardly extending flange 14 of the member 4 is provided with projections 17, and at the corresponding places on the end of the member 5 the latter is provided with projections 18. The projections 17 and 18 are provided with aligned openings adapted to receive pins such as 19. These pins are inserted in the aligned openings after the parts are assembled, i. e. after connection is made between adjacent piling sections, and serve to prevent relative rotation between between such sections. The pins are preferably not threaded and are provided with an eye at their upper ends so that, when it is desired to disassemble the piling, a wire or other tool may be inserted downwardly through the hollow piling, hooked through such eye, and the pins withdrawn, after which the piling units are rotated relatively and disconnected.

Figure 3:
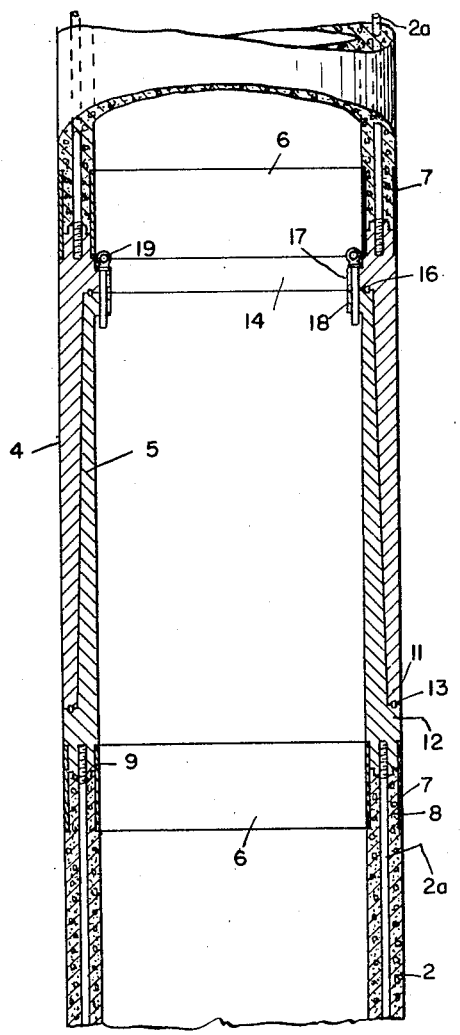
Figure 2:
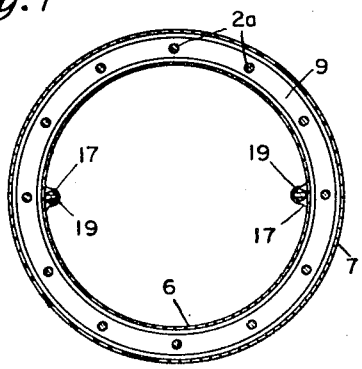
Fig. 2 is a transverse sectional view of the connection illustrated in Fig. 1 taken on a plane substantially indicated by the line 2—2.

The modification illustrated in Fig. 3 is identical in every respect with the form of construction illustrated in Fig. 1, with the exception that no means is provided in the modification of Fig. 3 for the purpose of securing the piling sections against axial displacement. In other words, the tapered surfaces of the members 4 and 5, where they are in overlying telescopic engagement, are not provided with threads such as the threads 10 which characterize the modification illustrated in Fig. 1.

Figure 4:
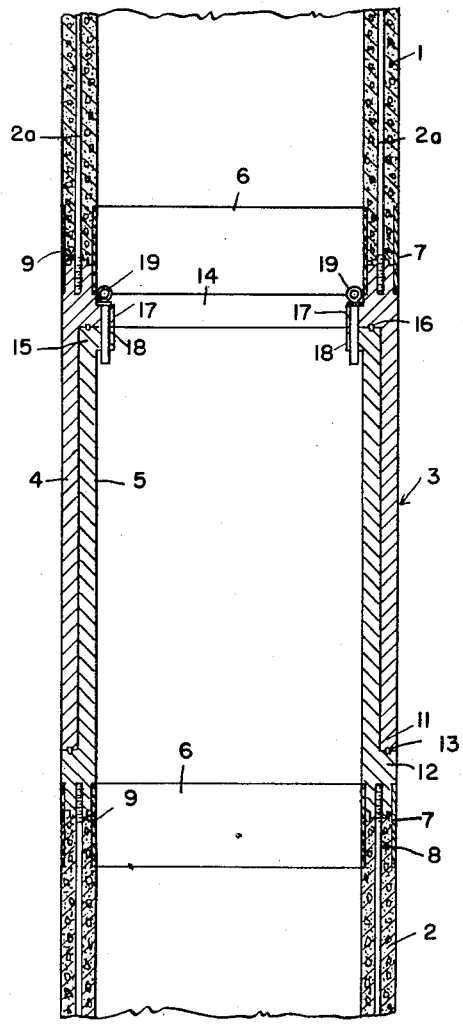

The modification illustrated in Fig. 4 is generally similar to that illustrated in Fig. 3 in that no threaded connection is provided between the male and female members. However, in Fig. 4, the telescopically overlying portions of the members 4 and 5 are cylindrical instead of being tapered as was the case in connection with the modifications of Figs. 1 and 3.

In Fig. 5, axial displacement between the two piling units is prevented by means of a well-known type of connection embodied in the male and female connecting members 4a and 5a. This connection may be described as generally similar to the well-known type of "bayonet" connection, and comprises a ring 20 welded or otherwise secured to the inner periphery of the female member 4a, with the male member cut away, as most clearly illustrated at 21 in Figs. 4 and 11, for a circumferential extent sufficient to permit the parts to be assembled, after which relative rotation between the male and female members to the extent of about 180° will cause the ring 20 to move into the slot 22 formed in the periphery of the male member 5a at the lower end of the relieved portion 21.

Figure 6:
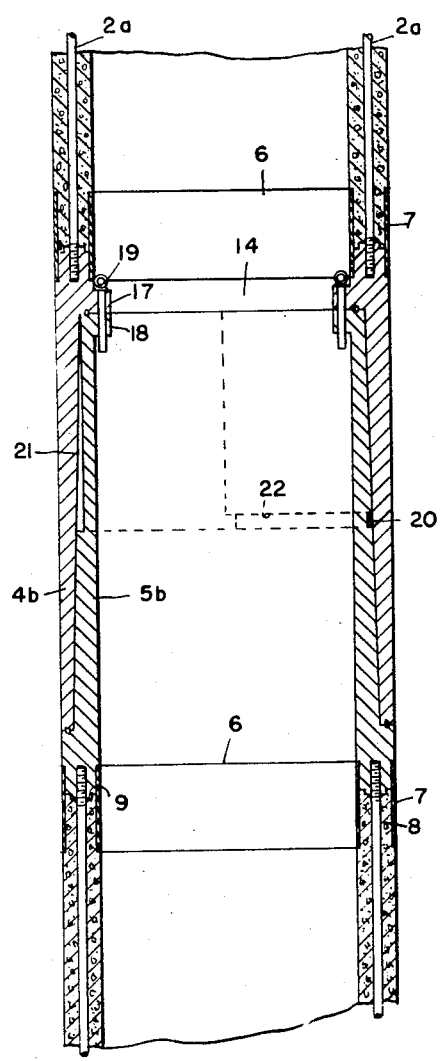

The modification illustrated in Fig. 6 is identical with that illustrated in Fig. 5, with the exception that the male member 5b and the female member 4b are tapered on their surfaces which are in overlying telescopic engagement when the parts are assembled.

The modification illustrated in Fig. 7 comprises a cylindrical female member 4c and a cylindrical male member 5c, the former having a radially inwardly projecting lug 23 secured thereto, the same adapted to extend into a slot 24 formed in or through the wall of the male member 5c so that, as the parts are moved into assembled relation, they are first moved relatively in a substantially helical fashion and then the connection locked by true relative circumferential movement, causing the lug 23 to move into the end of the circumferentially extending portion 25 of the slot 24. In the preferred embodiment of my invention when employing a connection such as that illustrated in Fig. 7, two such lugs 23 are employed at substantially diametrically opposite points on the inner periphery of the female member 4c, and accordingly two slots such as 24 are formed in the male member 5c. In Fig. 7, one of such slots is shown in full lines and the other in dotted lines.

Figure 8:
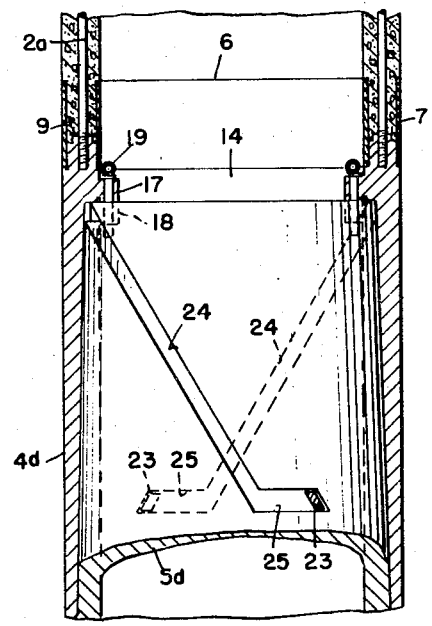

The modification illustrated in Fig. 8 is substantially identical with that illustrated in Fig. 7, with the exception that the female and male parts 4d and 5d respectively are tapered in the areas where they are in overlying telescopic engagement.

Fig. 12 shows the manner in which the principles of my invention may be employed in securing a piercing point to the lower-most of the piling units in the column. The pile unit 26 is pre-cast with the steel reinforcing bars 27 extending axially therefrom as at 28. There is then provided a piercing point 29 of any suitable material and in the upstanding flange 30 at the upper end of the point 29 there are provided a plurality of upstanding bars 31 similar to and opposite to the bars 28. The piercing point 29 and the piling unit 26 are brought into assembled relation with the rods 28 and 31 opposite to or adjacent to each other, after which such rods will be secured together as by welding as generally indicated at 32. A reinforcing metallic band such as 33 may be provided about the upstanding flange at the upper end of the piercing point 29. After the parts are thus assembled, the interior will then be filled with a body 34 of concrete, such concrete filling the space within the piercing head and also the space between the end of the piling unit 26 and the flange 30 on the piercing head. A suitable form will, of course, be placed about the assembly in the area between the upper edge of the band 33 and the lower edge of the piling 26, and, if desired, through such form there may be provided a passage through which the concrete for the insert 34 may be injected, or such concrete may be introduced through the upper end, not shown, of the piling unit 26.

The construction illustrated in Fig. 13 is somewhat different from that shown in Fig. 12 in that, in the construction of Fig. 13, the lower end 35 of the piling unit 36 is pre-cast along with the body of the piling unit. The head 35 is shaped to conform to the recess within the piercing point 37 so that the piercing point may be fitted snugly over the pre-cast end of the piling unit 36. Axially aligned rods 38 and 39 carried by the piling unit 36 and the piercing point 37 respectively are secured together as by welding at 40. An upstanding reinforcing flange 41 is provided similar to the flange 33 of the construction illustrated in Fig. 12. After the parts are thus assembled, the space, wherein the welded connection between the rods 38 and 39 is formed, is filled with concrete as at 42.

The pre-cast head 35 on the end of the piling unit 36 is provided with an opening axially thereof, through which may extend a fluid pressure conduit 43, the lower end of which is secured in a threaded opening 44 from which lead branch openings 45 which terminate on the laterally inclined face of the piercing point 37. The openings on the face of the piercing point into the branch passages 45 are closed by plugs 46 which are frictionally secured in such openings so that they may be displaced to unblock such openings upon the application of a predetermined pressure within the branch passages 45.

The piling units constructed in accordance with my invention are made in sections, with each unit, excepting the lower-most, provided with male and female connecting members at their opposite ends. By the use of such connection members, a plurality of piling units may be built up into a solid column which is, in each instance, locked against relative rotation between adjacent units of the column. When it is desired to disassemble any piling column thus built up, this may be accomplished either by disassembling the several sections one by one or by breaking the connection at an intermediate point in the column such that a plurality of separate units in assembled relation are disconnected from the remaining lower portion of the column.

When it is desired to "pull" the piling from its position embedded in the ground, then a connection such as that illustrated in any of Figs. 1, 5, 6, 7, and 8 may be employed. When it is desired to "pull" the entire string, then a piercing head such as that illustrated in Fig. 13 may be advantageously employed, since, prior to "pulling" the string of connected piling units, a fluid such as oil may be forced downwardly through the pressure conduit 43 to unseat the plugs 46, after which a continued supply of such fluid will cause the latter to flow upwardly along the outer surface of the string of piling, to not only loosen the same from the formation in which it is embedded, but, at the same time, provide a lubricant between such formation and the piling string to facilitate "pulling" the string.

It is important to note that in each of the various modifications of my improved connection, seals are provided whereby the telescopically overlying portion of the connection is sealed so that any corrosion-resistant material or lubricant placed therein at the time the sections are assembled will be retained throughout the time the various sections are in assembled relation.

Throughout the foregoing description, I have referred to the piling as made of reinforced concrete. It is obvious that the piling may be made of any other suitable material such as steel, wood, or the like. Furthermore, if the body of the piling unit is made of steel or other metal, the connection units at the ends thereof, instead of being formed separately, may be made unitary with the body of the piling unit.

The modification illustrated in Figs. 14 and 15 is generally similar to that illustrated in Fig. 13, excepting that in the modification of Figs. 14 and 15 I have additionally provided in the tubular body portion of the piling 47 a plurality of fluid pressure lines 48 arranged at equally spaced points about the inner periphery of the hollow piling. Each of such pressure lines 48 is provided with couplings generally indicated at 49 by which the pressure conduits 48 are placed in communication with passages 50 extending radially outwardly and rearwardly through the wall of the piling 47 with the outer ends of such passages 50 closed by means of plugs 51 which become unseated as pressure is built up inside the passages 50. By the provision of these auxiliary passages through the lateral walls of the piling, fluid under pressure may be forced through such walls and into the space surrounding the piling to not only free the same from the formation in which it is embedded but also to lubricate the opening in such formation occupied by the piling to facilitate "pulling" the piling. Check valves generally indicated at 52 may be provided in the pressure conduits 48 for the purpose of holding any pressure built up therein if the supply pressure should be cut off or reduced for any reason prior to the full release of the pressure out through the openings 50.

The point of the piling illustrated in Fig. 15 is like the point of the piling illustrated in Fig. 13 and accordingly like references will be employed to designate like parts.

In the modification illustrated in Figs. 16 and 17, I have shown the provision of rings such as 53 and 54 positioned either inside or outside of the hollow piling and either at or below the silt line 55 of the formation in which the piling is embedded. These rings are formed of hollow material such as steel or plastic and filled with an electrically detonated explosive charge which may be set off as for example by an electric current through the line 56 connected for example to the ring 53 and leading therefrom to the upper end of the piling. When an outside ring such as 54 is employed, it may be deposited on or slightly below the surface of the silt bed as by scraping away a portion of the silt bed surrounding the pile, then placing the ring, and then replacing the silt. Generally, it will be satisfactory to place the ring 54 on top of the silt bed at the line 55 as by merely lowering the ring 54 until it rests on the silt bed. This lowering is accomplished by cables such 57, one or more of which may be electrically conductive and connected to the detonation cap in the ring 54 for the purpose of exploding the same. Since such detonating device forms no part of the present invention, and its construction is well-known and familiar to those skilled in the art, it is believed unnecessary to describe the same in greater particularity. When utilizing the scheme illustrated in Figs. 16 and 17, the bursting of the charge in either the ring 53 or 54, or in both, when the two are used in combination, will serve to shatter the piling at the silt line sufficiently so as to sever the piling, thus permitting the piling extending above the silt line to be removed.

Other modes of applying the principle of the invention may be employed, change being made as regards the details described, provided the features stated in any of the following claims or the equivalent of such be employed.

I therefore particularly point out and distinctly claim as my invention:

1. A pile comprising an elongated hollow reinforced concrete body provided at its opposite ends respectively with complementary metallic members whereby a plurality of such piles may be removably secured in end-to-end relation into a rigid column, said concrete body provided with a plurality of longitudinally extending metallic reinforcing bars, each of said members having a head comprising an annulus secured to said reinforcing bars, and each such member provided with locking means effective to prevent relative rotation between the several piles in the column.

2. A pile comprising an elongated hollow reinforced concrete body provided at its opposite ends respectively with metallic complementary telescopic members whereby a plurality of such piles may be removably secured in end-to-end relation into a rigid column, said concrete body provided with a plurality of longitudinally extending metallic reinforcing bars, each of said members comprising a connecting portion, a head comprising an annulus secured to said reinforcing bars, and each such member provided with locking means effective to prevent relative rotation between the several piles in the column.

3. A pile comprising an elongated hollow reinforced concrete body provided at its opposite ends respectively with substantially cylindrical complementary male and female telescopic members whereby a plurality of such piles may be removably secured in end-to-end relation into a rigid column, said concrete body provided with a plurality of longitudinally extending metallic reinforcing bars, each of said members comprising a connecting portion, a head comprising an annulus secured to said reinforcing bars, and each such member provided with locking means effective to prevent relative rotation between the several piles in the column.

4. A pile comprising an elongated hollow reinforced concrete body provided at its opposite ends respectively with tapered metallic complementary male and female telescopic members whereby a plurality of such piles may be removably secured in end-to-end relation into a rigid column, said concrete body provided with a plurality of longitudinally extending metallic reinforcing bars, each of said members comprising a threaded tapered cylindrical connecting portion, a head comprising an annulus secured to said reinforcing bars, and each such member provided with locking means effective to prevent relative rotation between the several piles in the column.

5. A pile comprising an elongated hollow reinforced concrete body provided at its opposite ends respectively with tapered complementary male and female telescopic members whereby a plurality of such piles may be removably secured in end-to-end relation into a rigid column, said concrete body provided with a plurality of longitudinally extending metallic reinforcing bars, each of said members comprising a threaded tapered cylindrical connecting portion, a head comprising an annulus secured to said reinforcing bars, and each such member provided with a radially inwardly extending projection provided with an axially extending opening adapted to align with a similar opening in the adjacent member on the next adjacent pile in the column for the reception of a locking pin to prevent relative rotation between the several piles in the column.

6. A piercing point for piling comprising a pointed body having an opening centrally thereof adapted to be connected with a fluid pressure conduit, a branch passage leading therefrom to the laterally inclined face of the body and removable means blocking the outer end of such passage, said means being displaceable from such blocking position upon the occurrence within said passage of a predetermined pressure.

7. Piling comprising assemblable and disassemblable hollow concrete sections with connecting means including telescopic annular metallic members providing anchoring means for reinforcing bars, each said member having a radially inward projection with an axially extending opening to align with a similar opening in the projection of the adjacent member to receive a removable locking pin to prevent relative rotation.

8. Piling comprising assemblable and disassemblable concrete sections with connecting means including telescopic annular metallic members providing anchoring means for reinforcing bars, means at the opposite ends of the area of telescopic overlap of said members sealing the space between said members in such area, a corrosion-resistant material filling said space, each said member having a radially inwardly extending projection with an axially extending opening to align with a similar opening in the projection of the adjacent member to receive a removable locking pin to prevent relative rotation, and means for lubricating the external surface of the piling for removal including internal conduit means having communication with openings to the exterior at the lower end and at spaced points laterally, and removable means blocking said openings, said removable means being displaceable from such blocking position by a predetermined fluid pressure in the conduit means.

9. Piling comprising assemblable and disassemblable concrete sections with connecting means including telescopic annular metallic members providing anchoring means for reinforcing bars, each said member having a radially inwardly extending projection with an axially extending opening to align with a similar opening in the projection of the adjacent member to receive a removable locking pin to prevent relative rotation, and means for lubricating the external surface of the piling for removal including internal conduit means having communication with openings to the exterior at the lower end and at spaced points laterally, and removable means blocking said openings, said removable means being displaceable from such blocking position by a predetermined fluid pressure in the conduit means.

10. Piling comprising assemblable and disassemblable concrete sections with connecting means including telescopic annular metallic members providing anchoring means for reinforcing bars, removable means on the interior of said sections for preventing relative movement, and means for lubricating the external surface of the piling for removal including internal conduit means having communication with openings to the exterior at the lower end and at spaced points laterally, and removable means blocking said openings, said removable means being displaceable from such blocking position by a predetermined fluid pressure in the conduit means.

GEORGE MEIER.

REFERENCES CITED

The following references are of record in the file of this patent:

UNITED STATES PATENTS

| Number | Name | Date |
| --- | --- | --- |
| 1,079,375 | Stange | Nov. 25, 1913 |
| 1,293,693 | Burns | Feb. 11, 1919 |
| 1,688,064 | Upson | Oct. 16, 1928 |
| 2,351,288 | Riches | June 13, 1944 |

FOREIGN PATENTS

| Number | Country | Date |
| --- | --- | --- |
| 423,171 | Great Britain | 1935 |
| 4,320 | Netherlands | 1919 |